United States Patent [19]

Sugiura et al.

[11] Patent Number: 4,647,192
[45] Date of Patent: Mar. 3, 1987

[54] CARRIER DEVICE FOR DISC FILM

[75] Inventors: Yutaka Sugiura; Kazuyoshi Kobayashi, both of Chohu, Japan

[73] Assignee: Fuji Photo Film Co., Japan

[21] Appl. No.: 751,385

[22] Filed: Jul. 3, 1985

[30] Foreign Application Priority Data

Jul. 9, 1984 [JP] Japan .................................. 59-142005

[51] Int. Cl.⁴ ......................... G03B 27/32; H04N 7/18
[52] U.S. Cl. ......................................... 355/64; 358/97
[58] Field of Search .......................... 355/64; 354/121; 358/97, 102

[56] References Cited

U.S. PATENT DOCUMENTS

| 4,203,664 | 5/1980 | Clifton et al. | 355/64 |
| 4,204,733 | 5/1980 | Modney et al. | 355/64 |
| 4,396,282 | 8/1983 | Anderson | 355/64 X |
| 4,403,855 | 9/1983 | Anderson | 354/121 X |

FOREIGN PATENT DOCUMENTS 284,441  7/1950  Switzerland ........................... 358/97

Primary Examiner—Donald A. Griffin
Attorney, Agent, or Firm—Parkhurst & Oliff

[57] ABSTRACT

A carrier device for disc film for use in an image signal recorder for photographic images, for picking up a disc film by use of a video camera and recording the same on a magnetic disc.

This carrier device for a disc film can record a photographic image of a disc film, wherein lateral and longitudinal photograph positions are mixed with each other, as an upright image. In other words, when the photographic image is in the longitudinal position the photographic image is taken with the disc film as a whole being turned through 90°, so that the photographic image in the longitudinal position can be recorded as an upright image with no rotation of the video camera.

6 Claims, 5 Drawing Figures

CARRIER DEVICE FOR DISC FILM

BACKGROUND OF THE INVENTION

A. Field of the Invention

This invention relates to a carrier device for disc film, and more particularly to a carrier device for disc film for use in an image signal recorder for photographic images, wherein disc film or the like is picked up by use of a video camera and recorded in a recording medium such as a magnetic disc, a video tape or the like.

B. Description of the Prior Art

In general pick up a still image, there is used a photosensitive film having a disc-shaped body of rotation, i.e. a so-called disc film. From this disc film is obtained a hard copy, i.e. a print of an image recorded on the disc film. However, out of necessity, there has been a large demand for enjoying it as a soft copy. Since in general a disc film has a small frame of image it is necessary to enlarge the soft copy to a size of a picture area easy to enjoy. Furthermore, in the case of a negative type disc film it is necessary to invert the negative image into a positive image.

Due to the above-described necessities, there are instances where photographic images of a color or monochrome disc film are recorded on a magnetic disc, a video tape or the like one picture-frame after another, reproduced by a reproducer, and projected on a screen of a television set.

In any case, in the image signal recorder for photographic images of the type described, to observe these images, the photographic image is finally displayed on an indication device (a screen of a television set) as an image. However, the following disadvantage is recognized. Namely, in the case of the photographic images, picture-frames photographed in the longitudinal direction and picture-frames photographed in the lateral direction are mixed with each other. As a consequence, for example, photographic images are recorded on the magnetic disc, video tape or the like as they are, with a picture-frame photographed in the lateral position as a reference. Then, when the photographic images are projected on the screen of the television set, a photographic image photographed in the longitudinal direction is projected in the transverse direction, where the image is turned through 90°. In order to obviate the above disadvantage it is necessary in the case of the photograph in the longitudinal direction to pick up the photographic image with the video camera being turned through 90° or to pick up the photographic image with the video camera remaining unchanged and a picture-frame being turned through 90°. However, in the former case, it becomes necessary to provide a driving mechanism for turning the video camera, and, in order to turn the video camera with high accuracy and with no disorder in the optical axis of the video camera, there is a possibility that the driving mechanism becomes complicated in structure.

SUMMARY OF THE INVENTION

The present invention has been developed to obviate the above-described disadvantages of the prior art and has as its object the provision of a carrier device for a disc film, capable of recording photographic images of a disc film, in which the lateral positions and the longitudinal positions of photographing are mixed with each other, as an erecting image.

To achieve the above-described object, the present invention contemplates that the carrier device for a disc film comprises: a first rotary member formed at the central portion thereof with a rectangular opening opposed to a shape of a picture-frame of the disc film; and a second rotary member provided with a shaft member for engagingly supporting an engageable portion of the disc film, disposing the picture-frame of the disc film at a position opposed to the opening of the first rotary device and connected to the first rotary member; whereby the second rotary member is rotated, to thereby advance the disc film one picture-frame after another, turn the first rotary member to rotate the disc film about the picture-frame to be picked up through a predetermined angle depending on the lateral or the longitudinal position of the photographic image of the picture-frame of the disc film.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and therein.

DETAILED DESCRIPTION OF THE INVENTION

Detailed description will hereunder be given of the preferred embodiment of the carrier device for disc film according to the present invention with reference to the accompanying drawings.

Figure 1:
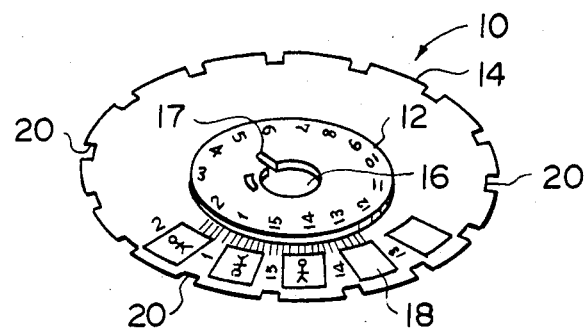
FIG. 1 is a perspective view showing the disc film as a subject to be picked up for use in this embodiment.

FIG. 1 shows a disc film 10 as a subject to be picked up for use in this embodiment. The disc film 10 is constituted by a circular core 12 formed of a plastic mold for example and a photosensitive film 14 supported by the core 12. The core 12 is formed at the center thereof with a circular hole 16, which is formed at the inner wall thereof with a key-way 17 as being an engageable portion. The photosensitive film 14 in this embodiment is formed with 15 rectangular picture-frames 18, in each of which is recorded a photographic image photographed in the longitudinal or lateral photographic image. Furthermore, formed on the outer periphery of the film 14 are notches 20 corresponding in number to the picture-frames 18 at regular intervals.

Figure 2:
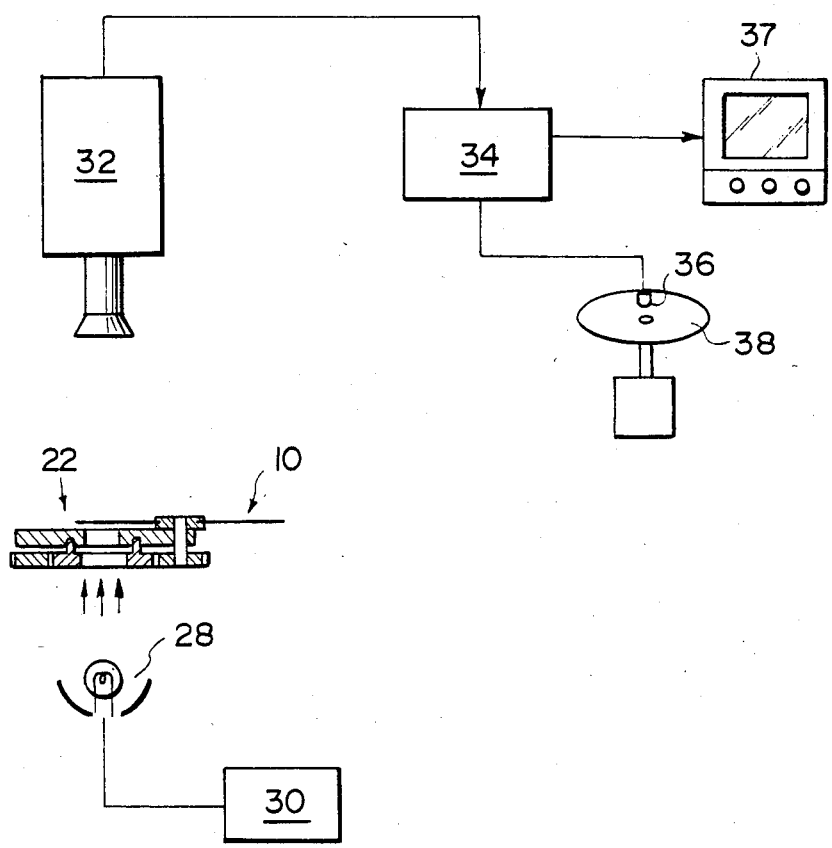
FIG. 2 is a block diagram showing the image signal recorder for photographic images used in this embodiment.

FIG. 2 is a block diagram showing the outline of the construction of the image signal recorder for photographic images for use in this embodiment. The disc film 10 shown in FIG. 1 is advanced one picture-frame after another by a film carrier 22 to be described hereunder. Further, provided below this film carrier 22 is a light source 28, which is connected to a power source and transmittingly irradiates the film 10 through an opening in the film carrier 22. Provided upwardly of the film carrier 22 is a video camera 32, which successively picks up the disc film 10 advanced one picture-frame after another by the film carrier 22. In the case of photographs in the longitudinal position, the video camera 32 reduces the magnification as compared with the case of photographs in the lateral position, so that the image as a whole can be displayed on the screen of the television set. Image signals picked up by the video camera 32 are processed by an image circuit 34 and recorded in an annular track of a magnetic disc acting as a recording medium one track after another through a magnetic head 36. At the same time, the recording condition is displayed by a monitor television set 37. Additionally, when the disc film 10 is a negative film, the image signals of the disc film 10 are processed to be inverted by the image circuit 34 from a negative to a positive film. Not shown though, an optical shutter or the like can be provided between the video camera 32 and the film carrier 22, so that a strong light from the light source 28 does not constantly fall in.

Figure 3:
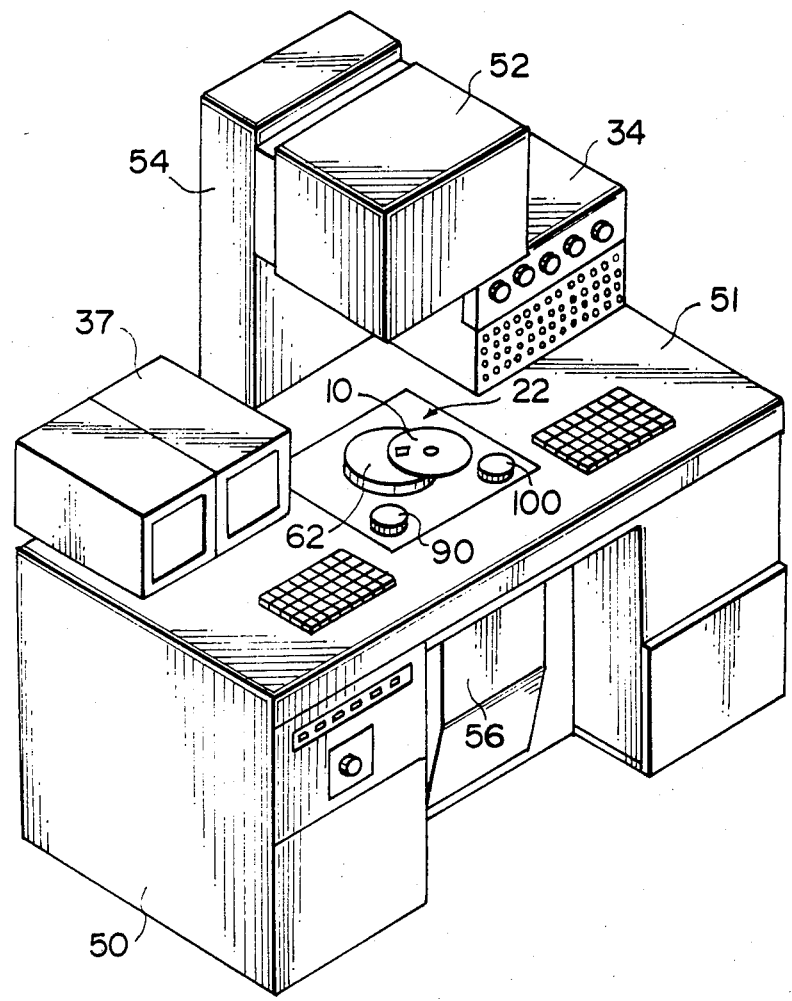
FIG. 3 is a perspective view showing the arrangement of the outer appearance of the image signal recorder of photographic images as shown in FIG. 2.

FIG. 3 shows the arrangement of the outer appearance of the image signal recorder of photographic images as shown in FIG. 2. Referring to FIG. 3, designated at 50 a casing, and 52 a camera box provided over the casing 50 through a post 54. Disposed in this camera box 52 is the video camera. A film carrier 22 is provided on a table surface 51 of the casing 50 and downwardly of the camera box 52. Disposed at the lower central portion 56 of the casing 50 are a light source 28, a power source 30 and the like. Further, disposed on the table surface 51 of the casing 50 are the image circuit 34 and the monitor television set 37.

Figure 5:
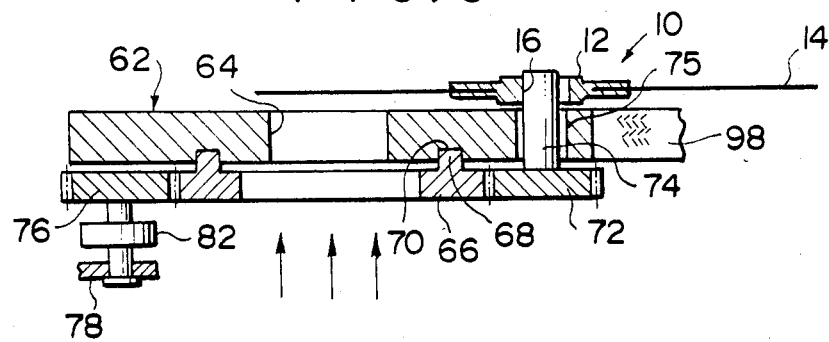
FIG. 5 is a sectional view taken along the line V—V in FIG. 4.
Figure 4:
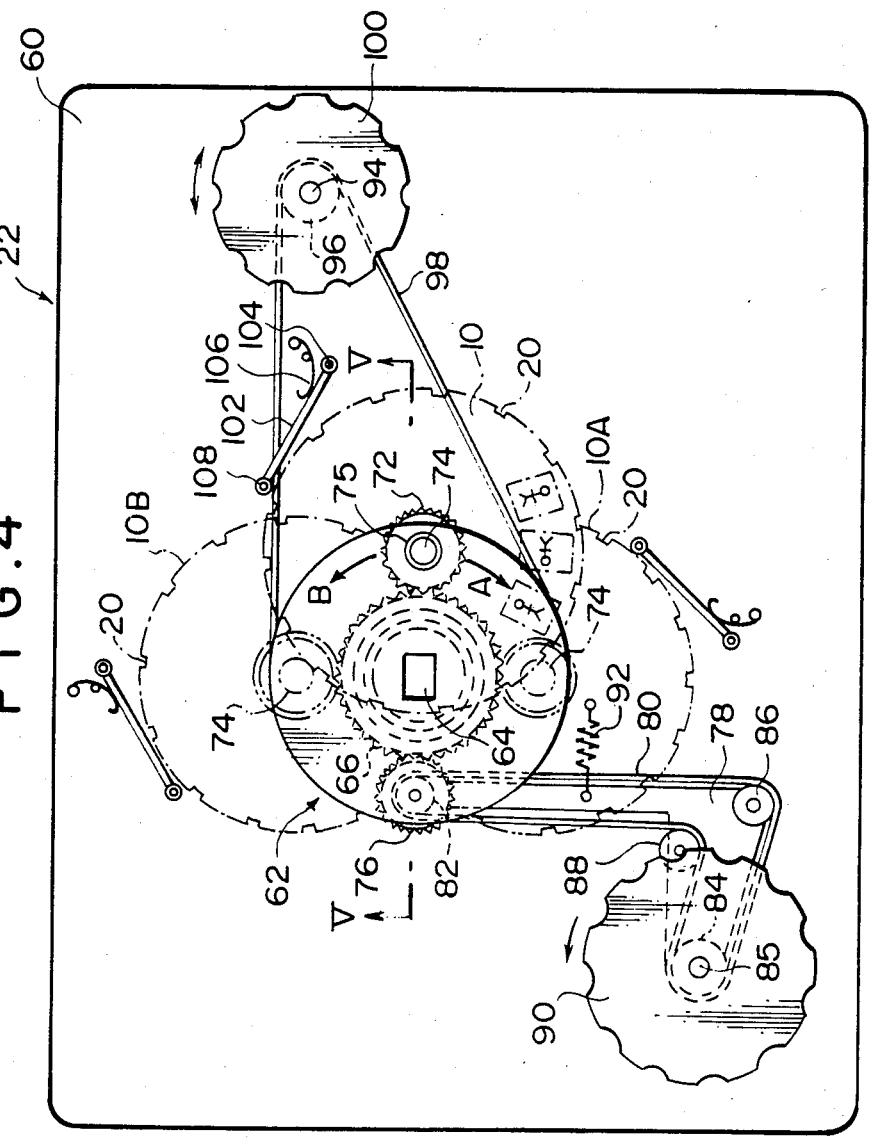
FIG. 4 is a plane view showing the essential portions of the carrier device for a disc film in this embodiment.

FIG. 4 is a plane view showing the carrier device for the disc film according to the present invention. FIG. 5 is an enlarged sectional view taken along the line V—V in FIG. 4. Description will now be given of this carrier device 22 for the disc film. A rotary disc 62 as being a first rotary member is rotatably supported on a base 60. This rotary disc 62 is formed at the rotary center thereof with a rectangular opening 64, having a size corresponding to the picture-frame 18 of the disc film 10. A gear 66 is provided on the undersurface of the rotary disc 62 so that it is rotatable with and coaxial with the rotary disc 62. More specifically, the gear 66 is formed on the top surface thereof with a ring-shaped ridge 68, which is coupled into a ring-shaped groove 70 formed on the rotary disc 62, whereby the gear 66 is rotatable relative to the rotary disc 62. This gear 66 is in mesh with a gear 72 as being a second rotary member to the right in FIG. 5, and this gear 72 supports the disc film 10 through a shaft 74 projecting from the top surface thereof. More specifically, the shaft 74 of the gear 72 is loosely inserted through a hole 75 of the rotary disc 62, and coupled at the top end portion thereof into the hole 16, whereby the disc film 10 is supported by the shaft 74. As a consequence, when the gear 72 rotates, the disc film 10 rotates in unison with the shaft 74, whereby the picture-frames 18 of the disc film 10 are successively sent to the position opposed to the opening 64 of the rotary disc 62.

Further, a gear 76 is in mesh with the gear 66 to the left in FIG. 5. As shown in FIG. 4, the gear 76 is provided on one end portion of a generally L-shaped lever 78. Provided coaxially with this gear 76 is a pulley 82 stretched therearound with a belt 80. Similarly, a pulley 84 is provided on the other end portion of the lever 78.

The belt 80 is stretched along the configuration of the lever 78 in the generally L-shape, further through other pulleys 86 and 88 as shown in FIG. 4. A control knob 90 is provided coaxially with this pulley 84. As a consequence, rotation of this control knob 90 causes the gear 76 to rotate through the belt 80, and the turning force is transmitted to the gear 72 supporting the disc film 10, so that the disc film 10 can be advanced one picture-frame after another. Additionally, a spring 92 is stretched between the lever 78 and the base 60 and urges the gear 76 toward the gear 66, i.e. the meshing direction.

A pulley 96 turning about a shaft 94 is provided on the base 60, and a belt 98 is stretched across this pulley 96 and the rotary disc 62. A control knob 100 is provided coaxially with this pulley 96. In consequence, rotation of the control knob 100 can rotate the rotary disc 62 through the belt 98. When the rotary disc 62 rotates through 90° in a direction indicated by an arrow marked A (the clockwise direction), the shaft 74 positioned in the hole 75 rotates about the opening 64 through 90° in unison therewith, whereby the disc film 10 comes to a position indicated by a hypothetical line 10A in FIG. 4. Furthermore, when the rotary disc 62 rotates through 90° in a direction indicated by an arrow B (the counterclockwise direction), the disc film 10 comes to a position indicated by a hypothetical line 10B, so that a picture-frame of a photographic image in the longitudinal position can be recorded as an erecting image with no rotation of the video camera 32.

Furthermore, rotatably supported on the base 60 through a shaft 104 is a stopper 102, which is abutted at the forward end portion 108 thereof against the peripheral edge of the disc film 10 through a leaf spring 106.

The following is the action of one embodiment of the present invention with the above-described arrangement.

Firstly, when the control knob 90 is rotated, the gear 72 is rotated through the belt 80, gear 76 and gear 66, whereby the disc film 10 is rotated. Abutted against the peripheral edge of the disc film 10 is the forward end portion 108 of the stopper 102. The forward end portion 108 of the stopper 102 is coupled into one of the notches 20 of the disc film 10, whereby the disc film 10 is intermittently rotated, i.e. advanced one picture-frame after another. The stopping position of the picture-frame to be picked up in the disc film 10 is located at a position opposed to the opening 64 of the rotary disc 62. As a consequence, the light source 28 disposed below the film carrier 22 transmittingly irradiates the picture-frame of the disc film 10, so that a predetermined frame can be picked up by the video camera 32. The picture-frame picked up by the video camera 32 is recorded in the magnetic disc 38 acting as the recording medium as described above, the recorded condition is displayed by the monitor television set 37 and can be inspected.

When the video camera 32 is referenced from the lateral position of the photographic image of the picture-frame of the disc film 10, if the picture-frame photographed in the longitudinal direction is recorded as it is, then the picture-frame is reproduced in the state of being photographed in the transverse direction during reproduction. As a consequence, the disc film should be rotated through 90°. The rotation of the disc film 10 is performed such that, firstly, the lever 78 is rotated about a shaft 85 against the force of the spring 92, the gear 76 is separated from the gear 66 to disconnect therefrom, whereby the picture-frame 18 is prevented from being advanced during rotation of the rotary disc 62. In this state, the control knob 100 is rotated in the clockwise direction, whereby the disc film 10 is rotated about a portion of the picture-frame positioned above the opening 64, so that the disc film 10 is moved to a position indicated by 10A in FIG. 4. In this position, the photographic image photographed in the longitudinal position has been rotated through 90°, whereby the photographic image recorded on the magnetic disc is recorded as an upright image. Furthermore, in the case of photographs in the longitudinal position, if the photograph is made upside down, then the control knob 100 is rotated in the counterclockwise direction, the disc film 10 is rotated through 90° in the other direction and moved to a position indicated by a hypothetical line 10B. In this position, the picture-frame, in which the photographic image has been photographed upside down, is recorded as an upright image.

In the above embodiment, visual inspection has been utilized to judge whether the photographic image of each picture-frame of the disc film is photographed in the longitudinal position or the lateral position. However, a mark formed on the core 12 or the film 14 may be optically, electrically or mechanically read to judge whether the mark indicates the longitudinal position or the lateral direction. Additionally, the signal indicating the lateral or the longitudinal direction need not necessarily be detected from the mark formed on the subject to be picked up, and may be obtained from another medium such as for example, a punch tape.

In the above embodiment, the first rotary member and the second rotary member have been manually operated. However, these members may be electrically operated by the driving of a motor. In this case, there may be provided a sensor for sensing the mark indicating the longitudinal or the lateral position, which is formed on the disc film and the first and the second rotary members may be automatically operated in response to a detection signal from this sensor.

In the above embodiment, the carrier device for the disc film according to the present invention has been applied to the image signal recorder for the photographic image. However, the present invention need not necessarily be limited to this, and may be used as a carrier device for the disc film in a photographic printer.

The carrier device for the disc film according to the present invention comprises: a first rotary member formed at the central portion thereof with a rectangular opening opposed to a shape of a picture-frame of the disc film; and a second rotary member provided with a shaft member for engagingly supporting an engageable portion of the disc film, disposing a picture-frame of the disc film at a position opposed to the opening of the first rotary member and connected to the first rotary member; whereby the second rotary member is rotated, to thereby advance the disc film one picture-frame after another, turn the first rotary member to rotate the disc film about a picture-frame to be picked up through a predetermined angle depending on the lateral or the longitudinal position of the photographic image of the frame, so that the device can record a photographic image of a disc film, in which the lateral positions and the longitudinal positions are mixed with each other, as an upright image by use of a simplified structure.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A carrier device for disc film having photographic images recorded on picture-frames thereon, whereby in order to reproduce the photographic images said disc film is provided at the center thereof with an engageable portion, and rotated about said engageable portion to advance said disc film one picture-frame after another, said carrier device comprising: a first rotary member formed at the central portion thereof with a rectangular opening, said rectangular opening corresponding to a shape of the picture-frames on said disc film; and a second rotary member provided with a shaft member for engagingly supporting said engageable portion of said disc film, said second rotary member being connected to said first rotary member and disposing consectutive ones of said picture-frames on said disc film at a position opposite to said rectangular opening of said first rotary member whereby said second rotary member is rotated to advance said disc film one picture-frame after another, and said first rotary member is rotated to rotate said disc film about said picture-frames to be picked up through a predetermined angle, said predetermined angle determined by whether the photographic images on said disc film are in a lateral or a longitudinal position.

2. A carrier device for disc film as set forth in claim 1, wherein an intermediate gear having teeth thereon and formed at the central portion thereof with an opening is rotatably supported on a rear surface of said first rotary member and wherein said second rotary member has teeth in mesh with said teeth of said intermediate gear.

3. A carrier device for disc film as set forth in claim 2, wherein said intermediate gear is in meshing engagement with a driving gear and said driving gear is disengageable from said intermediate gear.

4. A carrier device for disc film as set forth in claim 3, wherein said second rotary member has said shaft member loosely inserted through a hole formed in said first rotary member.

5. A carrier device for disc film as set forth in claim 4, wherein a belt is stretched around a peripheral surface of said first rotary member, and wherein said belt is driven to rotate said first rotary member, and simultaneously rotate said second rotary member about the center axis of said first rotary member through said shaft member, whereby said disc film is rotated about said picture-frames to be picked up.

6. A carrier device for disc film as set forth in claim 5, wherein a stopper member is provided, said stopper member having a shape corresponding to the shape of recesses formed on a peripheral edge of said disc film, and wherein said stopper member advances said disc film one picture-frame after another.

* * * * *